(12) United States Patent
Tvaruzek et al.

(10) Patent No.: US 11,761,435 B2
(45) Date of Patent: Sep. 19, 2023

(54) CRADLE BEARING AND CRADLE BEARING SUPPORT

(71) Applicant: Danfoss Power Solutions GmbH & Co OHG, Neumunster (DE)

(72) Inventors: Jaromir Tvaruzek, Ames, IA (US); Heiko Laffrenzen, Ostenfeld (DE)

(73) Assignee: DANFOSS POWER SOLUTIONS GMBH & CO. OHG, Neumunster (DE)

( * ) Notice: Subject to any disclaimer, the term of this patent is extended or adjusted under 35 U.S.C. 154(b) by 0 days.

(21) Appl. No.: 17/555,586

(22) Filed: Dec. 20, 2021

(65) Prior Publication Data
US 2022/0195999 A1    Jun. 23, 2022

(30) Foreign Application Priority Data
Dec. 21, 2020 (DE) .......................... 102020216394.4

(51) Int. Cl.
*F16C 19/36* (2006.01)
*F16C 19/50* (2006.01)
(Continued)

(52) U.S. Cl.
CPC ............ *F04B 1/148* (2013.01); *F16C 19/364* (2013.01); *F16C 19/502* (2013.01);
(Continued)

(58) Field of Classification Search
CPC ...... F16C 19/163; F16C 19/26; F16C 19/364; F16C 19/502; F16C 33/34; F16C 33/62;
(Continued)

(56) References Cited

U.S. PATENT DOCUMENTS 3,187,644 A    6/1965   Ricketts
3,274,948 A    9/1966   Baits
(Continued)

FOREIGN PATENT DOCUMENTS

CN    102192120 A    9/2011
DE    1927276 A1 *   2/1970
(Continued)

*Primary Examiner* — Phillip A Johnson
(74) *Attorney, Agent, or Firm* — McCormick, Paulding & Huber PLLC (57) ABSTRACT

A cradle bearing for supporting a swashplate of a variable hydraulic axial piston. The cradle bearing is of an angular ball bearing type or comprises, with respect to the bearing axis, a tapered inner race and/or a tapered outer race. A swashplate for a variable hydraulic axial piston unit including a first and a second cradle bearing zone spaced to each other in axial direction of a swashplate tilt axis, suitable for supporting the swashplate in a housing of a variable hydraulic axial piston unit, wherein the first cradle bearing zone is inclined with respect to the swashplate tilt axis. A variable hydraulic axial piston unit of the swashplate type including a swashplate which is supported rotatable in the housing of the variable hydraulic axial piston unit at a first bearing zone by a tapered bearing and at a second bearing zone by regular cylindrical cradle bearing or a journal bearing whose axis is aligned with the swashplate tilt axis.

6 Claims, 4 Drawing Sheets

(51) Int. Cl.
*F16C 35/077* (2006.01)
*F04B 1/148* (2020.01)
*F16C 33/58* (2006.01)

(52) U.S. Cl.
CPC .......... *F16C 33/583* (2013.01); *F16C 35/077* (2013.01); *F16C 2360/42* (2013.01)

(58) Field of Classification Search
CPC .. F16C 35/073; F16C 35/077; F16C 2360/42; F04B 1/148; F04B 1/2078; F04B 1/2085; F04B 27/0865; F03C 1/0631; F03C 1/0634; F03C 1/0668; F03C 1/0671
See application file for complete search history.

(56) References Cited

U.S. PATENT DOCUMENTS

| | | | |
|---|---|---|---|
| 3,605,565 A | 9/1971 | Berezinski | |
| 8,376,615 B2* | 2/2013 | Becker | F16C 33/4623 |
| | | | 384/2 |
| 9,157,423 B2* | 10/2015 | Tvaruzek | F16C 19/502 |
| 10,060,478 B2* | 8/2018 | Romer | F04B 1/2078 |
| 10,302,073 B2 | 5/2019 | Link | |
| 2006/0110082 A1* | 5/2006 | Tvaruzek | F16C 33/46 |
| | | | 384/2 |
| 2011/0007994 A1* | 1/2011 | Vornehm | F16C 19/502 |
| | | | 384/572 |

FOREIGN PATENT DOCUMENTS

| | | | | |
|---|---|---|---|---|
| DE | 31 35 605 A1 | | 3/1983 | |
| DE | 32 32 397 A1 | | 3/1983 | |
| DE | 102005019481 A1 | * | 11/2006 | ............ F16C 19/364 |
| DE | 10 2006 025 347 B3 | | 12/2007 | |
| DE | 102007059104 A1 | * | 6/2009 | ............. F04B 1/148 |
| DE | 10 2013 210 387 A1 | | 12/2014 | |
| DE | 102017126525 A1 | * | 10/2018 | |
| JP | S6429276 U | | 2/1989 | |
| JP | 2004-100599 A | | 4/2004 | |
| KR | 101879188 B1 | * | 7/2018 | |
| WO | WO-2013045166 A1 | * | 4/2013 | ............ F01B 3/0073 |

* cited by examiner

CRADLE BEARING AND CRADLE BEARING SUPPORT

CROSS-REFERENCE TO RELATED APPLICATION

This application claims foreign priority benefits under 35 U.S.C. § 119 to German Patent Application No. 102020216394.4 filed on Dec. 21, 2020, the content of which is hereby incorporated by reference in its entirety.

TECHNICAL FIELD

The invention is related to cradle bearings for supporting tiltable swashplates of hydraulic axial piston units. The invention is further related to swashplates for variable hydraulic axial piston units. The invention also relates to variable hydraulic axial piston units of the swashplate type.

BACKGROUND

In many variable hydraulic axial piston units of the swashplate type the displacement volume of the hydraulic unit is adjusted by tilting a swashplate around a tilting axis. In order to enable the tilting already with low actuation forces cradle bearings are provided between the swashplate and the housing of the hydraulic unit, such that the swashplate is accommodated in a rotatable manner and such that tilting of the swashplate with respect to a swashplate tilting axis is not hindered by high friction forces. In the state of the art, axial forces acting in the direction of the swashplate tilt axis due to kit moments and of out-of-center acting forces cannot be supported as the bearing arrangements, according to the state of the art, only exert reaction forces in directions orthogonal to the swashplate tilting axis. Additionally, this specific arrangement is prone to vibrations as the swashplate is generally not supported against the movement in the direction of the swashplate tilting axis. Vibrations lead to mechanical stress in the parts of the hydraulic unit. Therefore, these parts have to be designed in a vibration-reducing and robust way, which also leads to increased manufacturing cost of the hydraulic unit. Additionally, vibrations have a negative effect on the performance of the hydraulic unit, e.g. the pump noise is increased.

SUMMARY

It is therefore an object of the invention to provide a hydraulic unit of the swashplate type, which accommodates the swashplate in such a way that vibrations of the swashplate or other parts of the hydraulic unit are reduced and/or not transferred to the drive mechanism of the hydrostatic unit. It is also object of the invention to provide swashplate support means with a design that is vibration-reducing. Additionally, it is objective of the invention to provide a cradle bearing for supporting a swashplate of a variable hydraulic axial piston unit, which allows a vibration-resistant arrangement of a swashplate in the housing of a hydraulic unit. The swashplate supporting means, the swashplate and the variable hydrostatic unit shall furthermore comprise a robust design and shall be cost effective in manufacturing. It is an objective of the invention that the swashplate supporting means could be easily integrated into an existing supporting arrangement of hydraulic axial piston units, preferably as a spare part which replaces at least parts of current bearing assemblies.

The objects of the invention are solved by swashplate supporting means for the use in variable hydraulic axial units, e.g. a cradle bearing assembly, that exert axial forces in the direction of the swashplate tilting axis. Those axial forces can either directly balance the vibrations or kit moments occurring during the operation of a variable hydraulic axial piston unit, or they can serve as a pre-tensioning force which overlays the aforementioned disturbances, such that these forces cannot exert a negative influence on the operational behavior of the variable hydraulic axial piston unit.

A cradle bearing according to the invention for supporting a swashplate of a variable hydraulic axial piston unit comprises with respect to a bearing axis, e.g., a tapered inner race and/or a tapered outer race or is of an angular ball bearing type. The bearing axis defines the center of the circular paths along which the bearing parts move. When supporting a load the cradle bearing exerts a reaction force that is inclined with respect to the supported load and with respect to the bearing axis, due to the angular design of the cradle bearing.

In a special embodiment of the invention, the cradle bearing can be of the sliding bearing type or the hydrostatic bearing type. Sliding bearings are cheaper than bearings with rotating roller elements and can therefore be applied when a cost reduction of the cradle bearing is desired. However, those sliding or journal cradle bearings comprise worse friction characteristics than cradle bearings with roller elements. For improving the friction conditions hydraulic fluid of the variable axial piston unit, or of a different hydraulic pressure source, could be used to provide a hydrostatic bearing instead of a simple journal bearing or a roller bearing.

The inventive cradle bearing could also be designed as a roller bearing. Roller bearings provide lower friction coefficients than sliding bearings and do not require as much design effort as hydrostatic bearings. According to the inventive concept, spherical, cylindrical or tapered roller elements or other similar roller elements could be used depending on the design requirements. A person skilled in the art knows the characteristics that are provided by each type of bearing and will choose an appropriate bearing design.

In one embodiment of the invention, an inner shell of the cradle bearing is carrying the tapered inner race and shows a tapered inner mounting surface with respect to the bearing axis. In an alternative or the same embodiment, an outer shell of the cradle bearing is carrying the tapered outer race and shows a tapered outer mounting surface with respect to the bearing axis. This two-part design of the inner and/or outer race and respective shell allows the selection of different materials for race and shell. Preferably, the race is manufactured from a relatively hard material, whereas the shell can be built from a softer material.

For example, the inner race and/or the outer race can be made of metal, whereas the inner shell and/or the outer shell can be made of plastic or reinforced plastic material. As a result, the inner race and the outer race undergo low wear due to usage of the cradle bearing during operation of the hydraulic unit as they are made from a metal which is resistant against material fatigue. Also in this instance, the corresponding inner and/or outer shell provide the necessary geometry for mounting in, for example, a hydraulic unit casing and/or on a swashplate bearing zone and provide dampening characteristics as they are made from plastics or reinforced plastic material, which can be specifically tailored to dampen the vibrations occurring during operation of the hydraulic unit, e.g., by taking into account the critical vibration frequencies of the bearing system. If a reinforced plastic material is used the material characteristics can be even better attuned to the design loads, as the orientation of the reinforcing structures can be chosen accordingly. Additionally, plastic material is cheaper than metal, which leads to a reduction of the total cost of the cradle bearing.

Preferably, the circumferential length of the inventive cradle bearing is greater than 120°. Even more preferably, the circumferential length is greater than 140°. This length provides an increased supporting surface and guarantees that a higher number of roller elements can be used for the transfer of loads independently from the rotation angle of the swashplate.

An inventive cradle bearing could further comprises a cage that spaces the roller elements away from each other. The cage can additionally comprise a timing mechanism with which the cage with its roller elements is forced to follow the inner race when the inner race is displaced. By providing such a timing mechanism, it is ensured that the load which is supported by the cradle bearing, is divided on a maximum number of rolling elements independently from the position of the inner race relative to the outer race.

According to the invention, the selection of different materials for the cradle bearing cage and/or the timing mechanism is possible; e.g. metal, plastic or reinforced plastic material can be selected. A person skilled in the art will choose a material with suitable characteristics for specific applications and/or loads.

A swashplate for a variable hydraulic axial piston unit according to the invention comprises a first and a second cradle bearing area, which are spaced from each other in axial direction of a swashplate tilt axis. The first and second cradle bearing areas are provided for supporting the swashplate in a housing of a variable hydraulic axial piston unit, wherein a mounting and/or sliding surface in the first cradle bearing area is inclined with respect to the swashplate tilt axis. The first and second cradle bearing zones can be equipped with cradle bearings, e.g. with cradle bearings according to the invention.

According to the invention, the second cradle bearing surface can be oriented in parallel to the swashplate tilt axis. By choosing this arrangement, one inclined bearing surface (the first cradle bearing surface) and one bearing surface (the second cradle bearing surface) parallel to the bearing axis are provided. The bearing surfaces provide on one hand the possibility to arrange an inclined bearing at the inclined bearing surface, in order to provide support for an axial component of an operational force, and on the other hand provide a mere radial force bearing on the parallel second cradle bearing surface to support the loads exerted by the swashplate in a direction which is orthogonal to the swashplate tilt axis. In an exemplary embodiment, a pre-tensioning force can act in the direction of the swashplate tilt axis and can therefore be used to balance vibrations, or similar movements, that occur in direction of the swashplate tilt axis. A skilled person detects that a pre-tensioning force is not necessarily required for the function of the invention.

In a further embodiment of the invention, the swashplate comprises a receiving means at a distal end in direction of the swash plate tilt axis, for receiving a support element for supporting axial forces acting on the swashplate. Independently of the specific distal end of the swashplate, at which the receiving means are arranged, the receiving means are normally arranged outwardly from the two bearing areas and not in-between. The support element can comprise different additional characteristics, for example, the reduction of friction, the dampening in tilt axis direction, or being elastically deformable. The support element can be designed further as a one-part element but can also be formed as a two or multi-part element. It is obvious to a person skilled in the art that the characteristics, especially the material characteristics of the support element, are to be chosen according to the desired usage and functional design of the support element.

Preferably, in one embodiment of the invention, the swashplate's first cradle bearing surface faces towards that distal end at which the receiving means and the support element are arranged. In this case, an axial supporting or pre-tensioning force which, for example, may be exerted on the inclined swashplate bearing surface, is balanced by the support element, and is received by the receiving means. As mentioned earlier, depending on the design characteristics of the swashplate bearing the support element can fulfill different functions like, for example, balancing a pre-tensioning force exerted on the inclined first cradle bearing surface, dampening vibrations and giving an elastic feedback to an axial force, or compensating for temperature deformation and/or dilatation.

In one embodiment of the invention, the distal end of the swashplate comprising the receiving means is arranged distant of the first cradle bearing surface. In direction of the swashplate tilt axis the second cradle bearing surface is arranged between the receiving means and the first (inclined) cradle bearing surface. In such an arrangement, the supporting force angle is higher than in the arrangement of adjacent receiving means and first (inclined) cradle bearing surface; therefore, the fraction of supporting axial forces is higher compared to the orthogonal supporting force.

A variable hydraulic axial piston unit of the swashplate type can comprise a swashplate according to the invention. The swashplate is supported in a rotatable manner in the housing of the variable hydraulic axial piston unit at a first bearing zone and at a second bearing zone. At the first bearing zone, a tapered bearing according to the invention is arranged, whereas at the second bearing zone a regular cylindrical cradle bearing, or a journal bearing, whose axis is aligned with the swashplate tilt axis is arranged. A person skilled in the art detects that the regular cradle bearing does not necessarily comprise cylindrical roller elements; it can also be designed as a journal bearing or a hydrostatic bearing. Independently from the selected design option, it is essential, that the cradle bearing arranged at the second bearing zone exerts a reaction force on the swashplate, which is predominately directed in the same direction as the stroke of the axial pistons.

In contrast, the cradle bearing arranged at the first bearing zone is capable of supporting a force whose directional vector comprises an offset angle, compared to the force vector of the supported force. The combination of inclined and non-inclined reaction force vector allows the swashplate to support forces in direction orthogonal to the swashplate sliding surface, as well as forces in direction of the swashplate tilt axis, however low those forces may be. This does not influence the tilting behavior of the swashplate with respect to the swashplate tilt axis. By implementing such a swashplate support according to the invention, vibrations of the swashplate during operation of the axial hydraulic unit can be eliminated without any detrimental effect or negative influence upon the control behavior of displacement volume.

However, a common swashplate that does not comprise any inclined bearing zone can also be used in the variable hydraulic axial piston unit according to the invention, as an alternative to the bearing arrangement, as discussed. In this case, a tapered bearing according to the invention will be assembled at the first bearing zone such that an axial bearing force can be generated when kit loads occur during operation of the variable hydraulic unit have to be supported. At the second bearing zone, one of the bearing options exerting a reaction force that is substantially directed in the direction of the stroke of the axial pistons is disposed. This concept is applicable in combination with common swashplates known from the prior art. Only the cradle bearings have to be replaced when a common variable hydraulic unit of the swashplate type is to be upcycled in order to apply the inventive concept of generating bearing axial forces. The inclined cradle bearing according to the invention can even be provided as a spare part or spare assembly which can easily be integrated into hydraulic axial piston units according to the state of the art.

In one embodiment of the inventive variable hydraulic axial piston unit, a support element is arranged between the housing and one distal end of the swashplate, in direction of the swashplate tilt axis. Alternatively, the housing could comprise a support surface for supporting the swashplate in direction of the swashplate tilt axis. According to the invention the support element, or the support surface, is disposed in order to support the axial force component and/or to balance a pre-tensioning force that is exerted by the inclined bearing. The support element can additionally fulfill other functions than just supporting the axial force component or balancing pre-tensioning force. For example, the support element can provide an additional function that dampens the movement of the swashplate in direction of the swashplate tilt axis, in the case of occurring vibrations. Additionally, or as an alternative, the supporting element could be capable of balancing any temperature dilatations within the swashplate, the cradle bearings, and/or the housing of the hydraulic unit.

When driving/running hydraulic units, the operating temperature tends to rise in comparison to the temperature when the hydraulic unit stands still, consequentially the parts of the hydraulic unit will expand. This can lead to stiff mobility of parts, or even to a blockage of the swashplate relative to the housing of the hydraulic unit. In the hydraulic units which are known from the state of the art, the swashplate and housing dimensions have to be designed either with an axial clearance in tilt axis direction for cold conditions or with stiff swashplate movability in hot operation conditions. In the non-designed mode, a loss in efficiency results as deviations from the thermal presets lead to a change in the dimensions of the parts of the hydraulic unit; therefore the parts cannot interact as smoothly as predicted in any of the designed conditions. The inventive support element enables a design of the hydraulic unit to be independent from hot or cold operation modes. Blockages of the displacement and/or control system of the hydraulic unit are therewith avoided and efficiency is increased over a wider temperature range.

In an exemplary embodiment of the invention, the swashplate comprises a displacement point or pin for tilting the swashplate, wherein the first bearing zone is located closer to the displacement pin than the second bearing zone. The displacement pin provides an interface to which the (longitudinal) motion of an actuator can be transformed to a tilting motion of the swashplate. Preferably, the displacement pin is arranged at the opposite end of the swashplate to the receiving means for the inventive support element. However, it is also possible to arrange the displacement pin at the same distal end of the swashplate as the receiving means.

In an alternative embodiment, the second bearing zone is located closer to the displacement pin than the first bearing zone. The arrangement of the relative positions of receiving means, first and second bearing zones, and displacement pin may be chosen depending on the desired performance characteristics of the swashplate and/or design provisions for the hydraulic unit. It may be preferred to arrange the first bearing zone at a position adjacent to the displacement pin and the second bearing zone remotely, whereas the receiving means may be arranged at that distal end that is located opposite to the displacement point adjacent to the second bearing zone.

Preferably, the inclination of the first bearing zone is selected in such a way that the first bearing zone is concave towards the receiving means at which the support element or surface is disposed. As a result, the support element can be loaded by a compressive/balancing force which can be absorbed by many different materials. However, other arrangements may be chosen by a person skilled in the art, depending on the characteristics of the design of the hydraulic unit.

The selection of the material and/or geometry of the support element can be made from a wide range. The support element can be, for example, made of metal, bronze, plastic material, reinforced plastic material, rubber or any other suitable material that is capable of supporting axial loads in the direction of the swashplate tilt axis, and preferably of reducing friction forces at the distal end of the swashplate. This is important as the swashplate may tilt relative to the stationary support element or the stationary support surface at the housing, therefore, friction will occur between the surfaces moving relatively to each other. It would decrease the efficiency of the hydraulic unit if friction forces are high. A person skilled in the relevant art may choose different materials than the aforementioned materials if different characteristics are required.

The support element may be manufactured as a single part out of bronze, rubber, plastic, reinforced plastic or another material. The exemplary manufacturing process could be additive manufacturing, but it could also be by casting, injection-molding or abrasive manufacturing techniques. A person skilled in the relevant art may choose a combination of different materials and/or manufacturing techniques depending on the design specification and the desired material characteristics. The support element could also be designed as a multi-part element, e.g., if mechanically stressed parts shall be replaceable without replacing the complete support element.

The support elements may be designed as a hydraulic tappet. Hydraulic tappets provide a hydraulic dampening force and, therefore, provide an additional option to, for example, an elastic dampening of the aforementioned support elements.

The cradle bearing, the swashplate, and the variable hydraulic axial piston unit according to the invention solve the object of the invention by generating an axial force component in direction of the swashplate tilt axis that can be supported by an inventive supporting element. All in order to eliminate vibrations in the axial direction and/or temperature dilatations of the swashplate, the cradle bearing, and/or the housing of the inventive hydraulic unit. Therefore, the design or vibration loads, which partly provide the base for mechanical design of the hydraulic unit, can be reduced. This leads to lower manufacturing costs and a more robust design. Additionally, the stress resulting from 'wear and tear' fatigue is reduced.

BRIEF DESCRIPTION OF THE DRAWINGS

In the following figures, exemplary embodiments of the cradle bearing, the swashplate, and the variable hydraulic axial piston unit according to the invention are presented, as described. The presented embodiments do not limit the scope of the invention. The following figures show.

DETAILED DESCRIPTION

Figure 1:
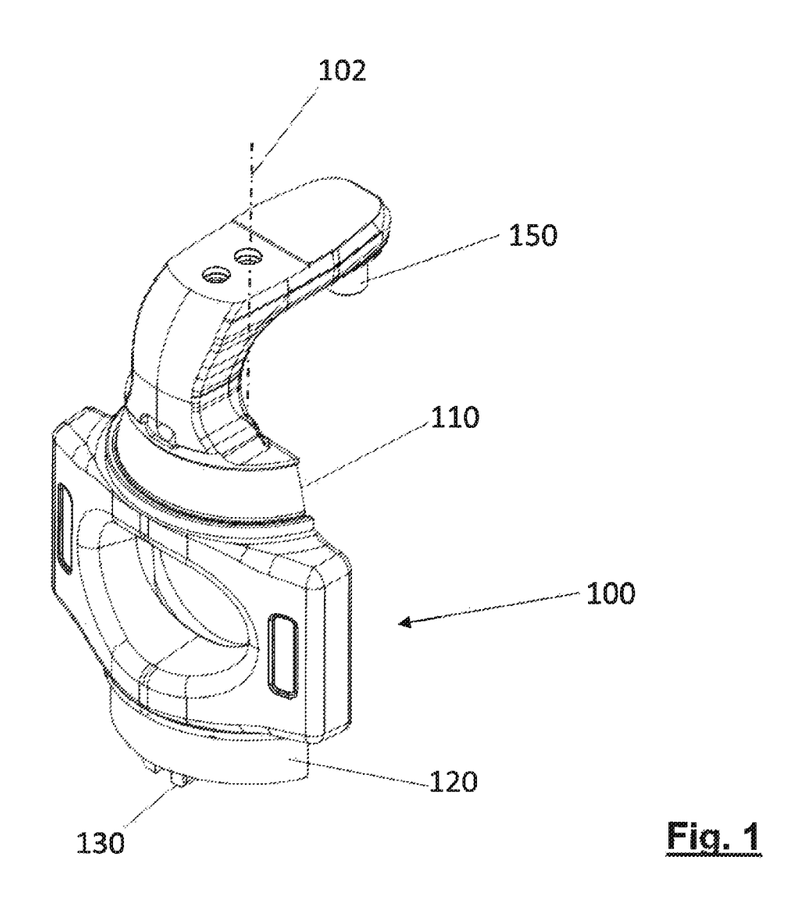
FIG. 1 shows a swashplate according to the invention in isometric view.

In FIG. 1, an isometric view of a swashplate according to the invention is shown. The swashplate 100 comprises a swashplate tilt axis 102, which is shown as a dashed-dotted line and which represents the center of rotation around which the swashplate is tilted when a (longitudinal) displacement force actuates on a displacement pin 150. The inventive swashplate 100 further comprises two bearing surfaces 110, 120, to which cradle bearings can be arranged. A first cradle bearing surface 110 is inclined with respect to the swashplate tilt axis 102. A second cradle bearing surface 120 is substantially parallel to the swashplate tilt axis 102. Furthermore, the swashplate 100 comprises receiving means 130, which is oriented in the direction of the swashplate tilt axis 102 for receiving a support element 140. See also FIG. 2, showing a back view of swashplate 100.

Figure 2:
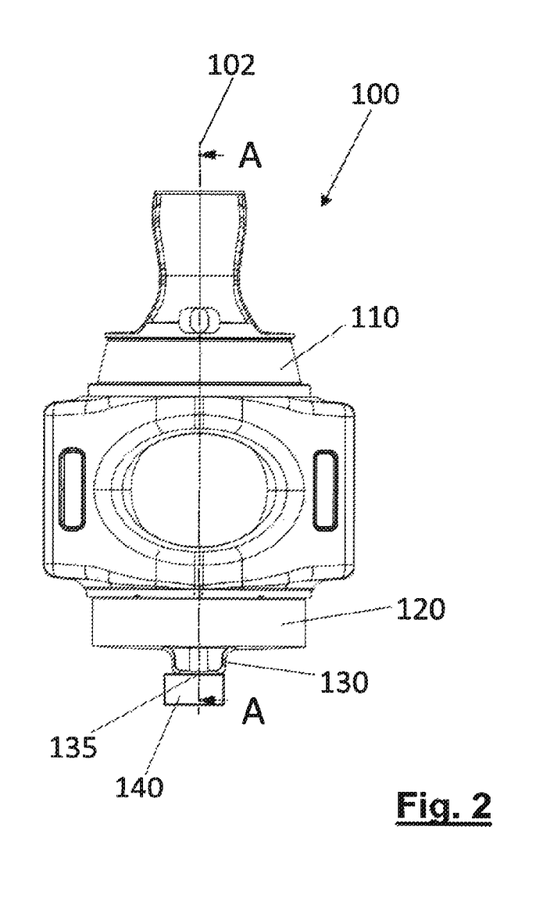
FIG. 2 shows the swashplate of FIG. 1 in back view.

FIG. 2 shows a back view of the inventive swashplate 100 with a first cradle bearing surface 110, that is inclined with respect to the swashplate tilt axis 102, and a second cradle bearing surface 120 parallel to the swashplate tilt axis 102. Additionally, a support element 140 is received by the receiving means 130 such that forces acting in the direction of the swashplate tilt axis can be supported.

Figure 3:
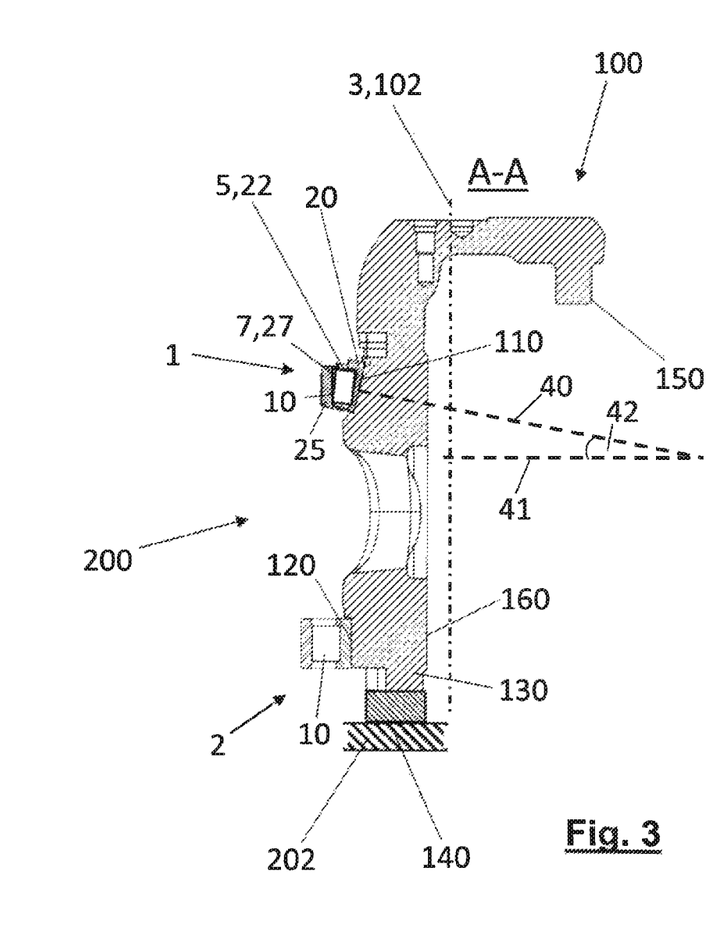
FIG. 3 shows a first embodiment of a variable hydraulic axial piston unit according to the invention in sectional view.

FIG. 3 shows a sectional view of an inventive swashplate 100 for a hydrostatic unit 200 with variable displacement, which is taken along the section line A-A in FIG. 2. Two cradle bearings 1, 2 are arranged at the first and second cradle bearing surfaces 110, 120. The vertical dashed-dotted line represents the swashplate tilt axis 102. At the first cradle bearing surface 110, a cradle bearing 1 with inclined direction of supporting force 40 is disposed, whereas the cradle bearing 2, which is arranged at the second cradle bearing surface 120, comprises a bearing axis 3, which is aligned with the swashplate tilt axis 102. The cradle bearing 2 is capable of supporting forces which are oriented in the direction of the stroke of the working pistons (horizontal in FIG. 3) and act on the swashplate sliding surface 160. For illustration purposes, the horizontal direction corresponds with the cylinder block axis and with the drive shaft axis of a hydrostatic axial piston unit of the swashplate type, respectively. In the embodiment of FIG. 3, a tapered cradle bearing 1 is assembled such that the supporting force exerted on the tapered cradle bearing 1 comprises an axial force component which is oriented in the direction of the swashplate tilt axis 102. This axial force component is supported by the housing 202 of a variable hydraulic unit via the support element 140, which is received by the receiving means 130 of the swashplate 100. The inclined supporting force 40 and the horizontal supporting force 41 include a supporting force angle 42. The greater the supporting force angle 42, the higher the vertical (axial) component of the supporting force 40 of the inclined cradle bearing 1 will be. The supporting angle 42 can therefore be seen as an indication of how high are the axial supporting or pre-tensioning forces in relation to the horizontal bearing forces for supporting the (vibration) loads occurring during running operation of a variable hydraulic axial piston unit 200 (not shown) equipped with a swashplate 100 according to the invention. The higher the axial loads are supposed to be, the higher the supporting force angle 42 should be.

The inclined/tapered cradle bearing 1 according to the invention, which is shown in FIG. 3, comprises an inclined inner race 5 that is mounted on an inner mounting surface 22 of an inner shell 20. In contrast, the outer mounting surface 27 of shell 25 of the inclined bearing 1 is substantially parallel to the swashplate tilting axis 102. The inventive inclined cradle bearing 1 comprises cylindrical or conical roller elements 10, which run on the inner race 5 and the outer race 7. As the inner race 5 and the outer race 7 are separated from the inner shell 20 and the outer shell 25, it is possible to choose different materials for races and shells, so that the material properties can be specifically tailored to the desired bearing characteristics, e.g., dampening and/or low wear. In the embodiment of FIG. 3, the bearing 2 with horizontal supporting force vector 41 is designed as a standard cradle bearing with cylindrical shape and preferably with cylindrical roller elements 10, however, it could also be designed with spherical roller elements or as a journal or hydrostatic bearing, just to provide examples.

Figure 4:
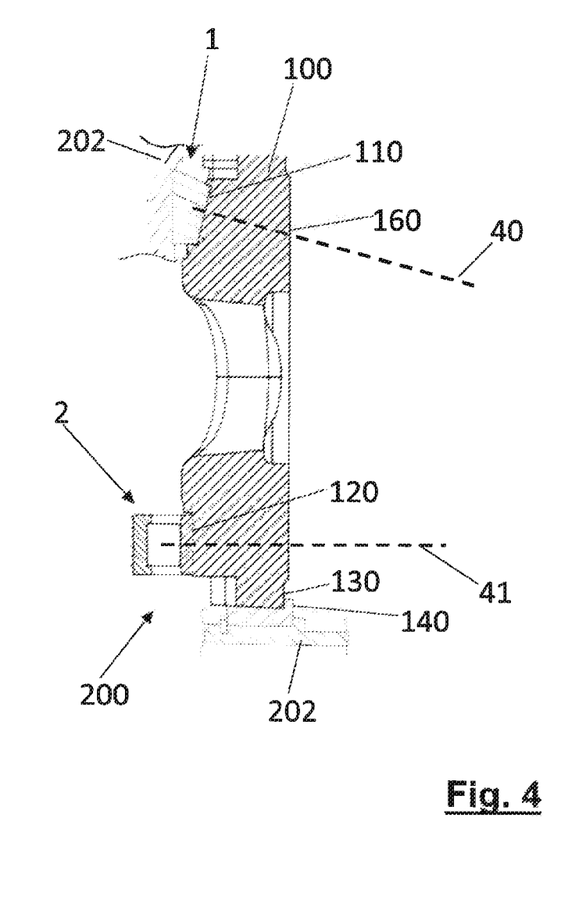
FIG. 4 shows a second embodiment of a variable hydraulic axial piston unit according to the invention in sectional view.

FIG. 4 shows a different bearing arrangement, by the aid of which the swashplate 100 is rotatable accommodated in the housing 202 of an inventive variable hydraulic axial piston unit 200. The inclined bearing 1 is accommodated on the first bearing surface 110, which is inclined and is designed as journal bearing, also called sliding bearing, such that it does not comprise any roller elements 10, since a sliding element 12 is suitable to lower friction forces and/or to avoid steel-iron contact. Preferably, the sliding element is designed to compensate the inclination of bearing surface 110 to the outer mounting surface 27 which is parallel to the swashplate tilt axis 102 or the sliding surface 160, respectively. The non-angular bearing 2 is exemplarily designed as common cradle bearing with cylindrical roller elements. The swashplate 100 is axially (vertically) supported at the housing 202 via supporting means 140 that are held by receiving means 130 at one distal end of the swashplate 100, in this embodiment the lower distal end. Preferably, all sliding/bearing elements that can be moved relative to the swashplate are manufactured from a material providing a low friction coefficient in order to maintain a high degree of efficiency when the swashplate 100 is tilted. It is obvious to a person skilled in the art that the specific arrangement of bearings, comprising roller elements and/or frictional bearing can be interchanged. For example, the inclined bearing 1 could be designed as a roller bearing, whereas the non-angular bearing 2 could be designed as a sliding bearing. Similarly, both or neither of the bearings could be designed as sliding bearings.

Figure 5:
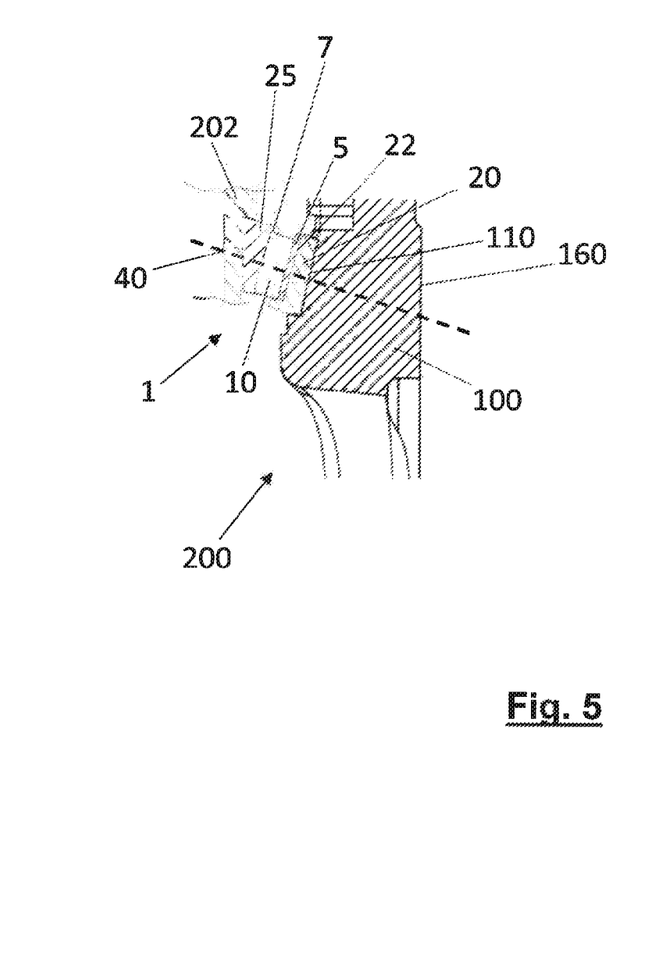
FIG. 5 shows a detailed view of a first embodiment of a bearing arrangement according to the invention.
Figure 6:
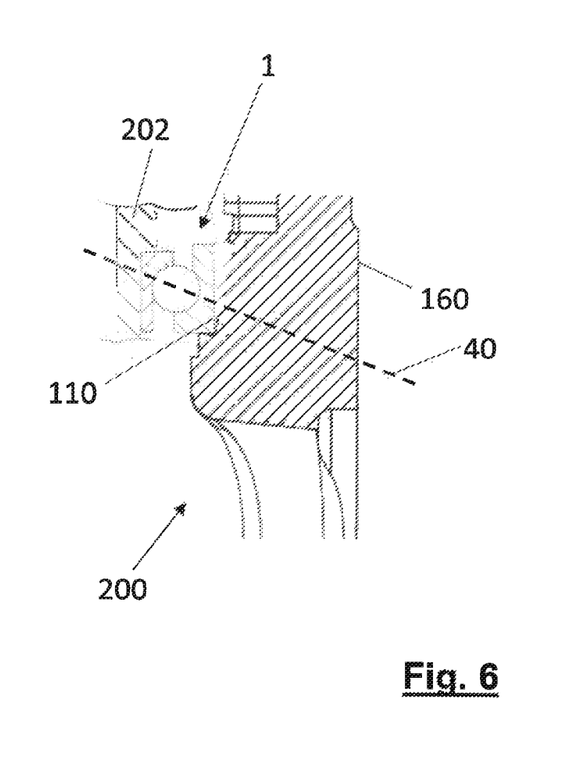
FIG. 6 shows a detailed view of a second embodiment of a bearing arrangement according to the invention.
Figure 7:
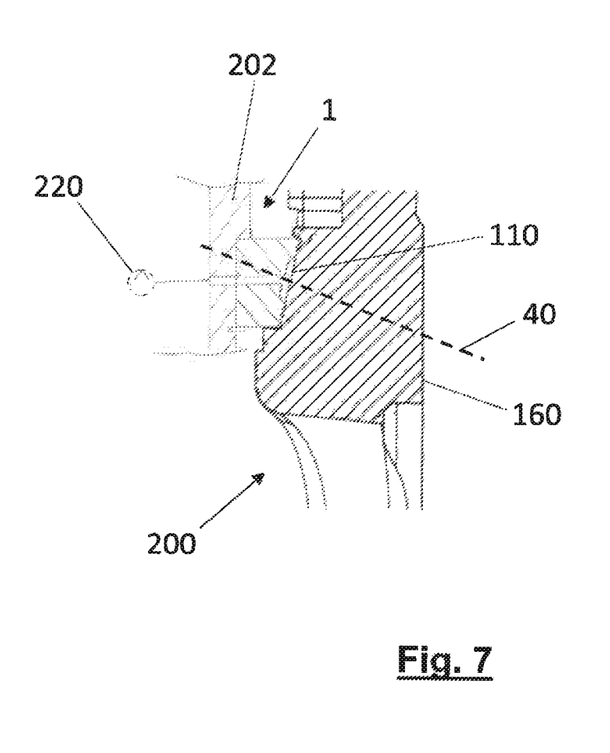
FIG. 7 shows a detailed view of a third embodiment of a bearing arrangement according to the invention.

The FIGS. 5 to 7 show detailed views of further embodiments of inclined bearings 1 according to the invention. FIG. 5 shows an inclined bearing 1 comprising an inclined inner race 5 and a separate inner shell 20. The outer race 7 is simultaneously designed as outer shell 25 and comprises an inclined race in combination with a substantially non-inclined outer mounting face 27. The outer shell 25 abuts against the housing 202 of the inventive variable hydraulic axial piston unit 200. The bearing 1 comprises cylindrical roller elements 10.

FIG. 6 depicts an angular ball bearing 1, which exerts a supporting force 40 with an inclined force vector. In contrast to FIGS. 5 and 7, the angular ball bearing 1 according to FIG. 6 is disposed on a non-inclined cylindrical bearing surface 110 of the swashplate 100.

FIG. 7 shows another embodiment of an inventive cradle bearing 1 which is designed as a hydrostatic bearing. An external pressure source 220 feeds pressurized fluid to the inclined first cradle bearing surface 110. The pressurized fluid serves as a lubricant and a support film which distances the adjacent and relatively moving surfaces of the bearing 1 and the swashplate 100. Generally, the system or charge pressure of the hydrostatic unit 200 itself could be used as a pressure source for the hydrostatic bearing 1. Especially during the startup process of the hydraulic axial piston unit 200 or other periods—when no or a low pressure difference is generated by the hydrostatic unit 200—, however, it may be preferential to use an external pressure source 220 for providing pressurized fluid to the cradle bearing surface 110 according to the invention. It is covered by the scope of the invention that a hydrostatic bearing could also serve as non-angular bearing 2.

From the above disclosure and the accompanying figures and claims, it will be appreciated that the cradle bearing according to the invention, the swashplate according to the invention and the variable hydraulic axial piston unit according to the invention offer many possibilities and advantages over the prior art. It will be appreciated further by a person skilled in the relevant art that further modifications and changes to cradle bearings, swashplates and variable hydraulic axial piston units known in the art could be made to the aforementioned 10 inventive concepts without parting from the spirit and scope of this invention; therefore, all these modifications and changes fall within the scope of the claims and are covered by them. It should be further understood that the examples and embodiments described above are for illustrative purposes only and that various modifications, changes or combinations of embodiments in the light thereof, which will be suggested to a person skilled in the relevant 15 art, are included in the spirit and purview of this application.

What is claimed is:

1. A cradle bearing for supporting a swashplate of a variable hydraulic axial piston unit, wherein the cradle bearing is of an angular ball bearing type or comprises, with respect to the bearing axis, a tapered inner race and/or a tapered outer race, and wherein an inner shell carrying the tapered inner race shows a tapered inner mounting surface with respect to the bearing axis and/or wherein an outer shell carrying the tapered outer race shows a tapered outer mounting surface with respect to the bearing axis.

2. The cradle bearing according to claim 1, wherein the cradle bearing is of the sliding bearing type or the hydrostatic bearing type.

3. The cradle bearing according to claim 1, wherein the cradle bearing is of the roller bearing type and comprises spherical, cylindrical or conical shaped rolling elements.

4. The cradle bearing according to claim 1, wherein the inner race and the outer race are made of metal, and wherein the inner shell and/or the outer shell are made of plastic or reinforced plastic material.

5. The cradle bearing according to claim 1, wherein the circumferential length of the inner race is greater than 120 degrees.

6. The cradle bearing according to claim 1, wherein the circumferential length of the inner race is greater than 140 degrees.

* * * * *